(12) United States Patent
Pan et al.

(10) Patent No.: US 12,420,510 B2
(45) Date of Patent: Sep. 23, 2025

(54) INTELLIGENT FECAL SOLID-LIQUID SEPARATOR FOR CATTLE MATTRESS BEDDING MATERIAL PRODUCTION SYSTEM AND OPERATING METHOD THEREOF

(71) Applicant: Hangzhou Vocational & Technical College, Hangzhou (CN)

(72) Inventors: Chengen Pan, Hangzhou (CN); Zengxuan Pan, Hangzhou (CN); Ting Zhao, Yiwu (CN); Yunjia Lou, Hangzhou (CN)

(*) Notice: Subject to any disclaimer, the term of this patent is extended or adjusted under 35 U.S.C. 154(b) by 315 days.

(21) Appl. No.: 18/353,383

(22) Filed: Jul. 17, 2023

(65) Prior Publication Data
US 2024/0399696 A1    Dec. 5, 2024

(30) Foreign Application Priority Data
Jun. 2, 2023    (CN) .......................... 202310653712.2

(51) Int. Cl.
| | |
|---|---|
| *B30B 9/12* | (2006.01) |
| *A01K 1/01* | (2006.01) |
| *B09B 3/32* | (2022.01) |
| *B09B 3/35* | (2022.01) |
| *B09B 3/40* | (2022.01) |
| *B30B 9/22* | (2006.01) |

(52) U.S. Cl.
CPC .............. *B30B 9/12* (2013.01); *A01K 1/0103* (2013.01); *A01K 1/0139* (2013.01); *B09B 3/32* (2022.01); *B09B 3/35* (2022.01); *B09B 3/40* (2022.01); *B30B 9/22* (2013.01)

(58) Field of Classification Search
CPC .. B30B 9/12; B30B 9/127; B30B 9/14; B30B 9/18; B30B 9/22; B09B 3/32; B09B 3/35; B09B 3/40; B09B 5/00; C02F 11/121; C02F 11/13; A01K 1/0103; A01K 1/0139
See application file for complete search history.

(56) References Cited

U.S. PATENT DOCUMENTS

| | | | | |
|---|---|---|---|---|
| 4,253,390 A | * | 3/1981 | Hunt ....................... | B30B 9/163 99/638 |
| 10,343,847 B1 | * | 7/2019 | Allard ...................... | B30B 9/26 |
| 2001/0039887 A1 | * | 11/2001 | Reddoch .................. | B30B 9/26 100/117 |

FOREIGN PATENT DOCUMENTS

| | | | | |
|---|---|---|---|---|
| CN | 215040546 U | * | 12/2021 | ............. B30B 9/267 |
| WO | WO-9304754 A1 | * | 3/1993 | ........... B01D 11/023 |
| WO | WO-2012095706 A1 | * | 7/2012 | ......... B02C 18/0084 |

* cited by examiner

Primary Examiner — Jimmy T Nguyen
(74) Attorney, Agent, or Firm — Birchwood IP (57) ABSTRACT

An intelligent fecal solid-liquid separator for a cattle mattress bedding material production system and an operation method thereof. The cutting assembly is located directly above the first cutting groove. By setting a cutting assembly, the further extrusion is achieved to realize solid-liquid separation of separated solid waste. Further, by utilizing the cooperation between the pressing plate and the spring, it ensures the extrusion pressure of the waste spiral extrusion, thereby improving the accuracy of solid-liquid separation.

10 Claims, 5 Drawing Sheets

INTELLIGENT FECAL SOLID-LIQUID SEPARATOR FOR CATTLE MATTRESS BEDDING MATERIAL PRODUCTION SYSTEM AND OPERATING METHOD THEREOF

TECHNICAL FIELD

The present disclosure relates to the field of solid-liquid separation technology for cattle mattress production, in particular to an intelligent fecal solid-liquid separator for a cattle mattress bedding material production system and an operating method thereof.

BACKGROUND

In order to improve the utilization and treatment of cattle manure, In existing technology, cattle manure is treated of solid-liquid separation, and the solid waste is used for preparing cattle mattress bedding material and liquid waste is used for reuse as fertilizer.

In existing technology, intelligent devices are usually used instead of manual processing to divide the production process of cattle mattress bedding materials into four steps. Firstly, critical parameters such as water content, density, and particle size of cattle manure raw materials are intelligently detected and extracted online, proving feedback information of detected parameters. Then comparing the feedback parameters with the database of the expert system, the parameters are continuously adjusted through intelligent devices with autonomous learning, and integrate environmental and weather factors into algorithms to explore the optimal parameters of the cattle mattress material.

The type of the existing solid-liquid separation devices includes screw extrusion and centrifugal separation, and the treatment of cattle manure usually uses screw extrusion. However, the existing screw extrusion solid-liquid separation devices can only achieve preliminary separation of solid and liquid, with low separation efficiency, poor quality, and the separated raw materials cannot be formed, which leads to difficult transportation, unpleasant odor, and easy impact on the environment.

SUMMARY

The objective of the present disclosure is to provide an intelligent fecal solid-liquid separator for a cattle mattress bedding material production system and an operating method thereof, in order to solve the problems proposed in the background.

To achieve the above objective, the present disclosure provides the following technical solution:

An intelligent fecal solid-liquid separator for a cattle mattress bedding material production system, including a solid-liquid separator. The solid-liquid separator includes:

A separation tank, wherein the separation tank is horizontally provided with an extrusion screw rod driven by a drive motor, a feeding pipeline is connected to one end of the separation tank, a lower end of the separation tank is connected to a waste water tank, one end of the separation tank away from the feeding pipeline is provided with a bracket, the bracket is provided with an upper lifting post vertically arranged and downward extending, a length of the extrusion screw rod is smaller than a length of the separation tank, a gap between an end of the extrusion screw rod and an inner wall of the separation tank is set with an extrusion inner cavity, a semicircular opening groove runs through a lower part of the extrusion inner cavity, and a first cutting groove is arranged at an upper end of the extrusion inner cavity corresponding to the upper lifting post;

A pressure bearing assembly, including a pressing plate, a spring, a transverse telescopic sliding rod, and a heating sheet, wherein the pressing plate is slidably arranged in the extrusion inner cavity, a heating sheet is arranged on one side wall of the pressing plate near the extrusion screw rod, an other side of the pressing plate is connected to the transverse telescopic sliding rod, the transverse telescopic sliding rod is horizontally sleeved with the spring, the spring is located in the extrusion inner cavity, and two ends of the spring are pressed between the pressing plate and a lateral inner wall of the extrusion inner cavity;

A cutting assembly located directly above the first cutting groove, including a fixed airbag, a micro air pump, a protective ring, a first side plate, a second side plate, and a semicircular cutting knife, wherein the cutting assembly is fixedly arranged at a lower end of the upper lifting post, a middle of the fixed airbag is connected to the protective ring, two side walls of the fixed airbag are tightly bonded to the first side plate and the second side plate respectively, the first side plate and the second side plate are pressed on both sides of the protective ring, a semicircular cutting knife is arranged at a lower end of the protective ring, the first side plate faces the extrusion screw rod, and the second side plate faces the extrusion inner cavity;

A transmission assembly, including an arc sealing plate, a lower lifting post, a inclined guide frame, and a cooling conveyor belt, wherein the arc sealing plate is sealed and snapped in the semicircular opening groove, a lower end of the arc sealing plate is vertically connected to the lower lifting post, one side of the lower lifting post is provided with the inclined guide frame and the cooling conveyor belt interconnected with each other.

Preferably, a lower inner wall of an inner chamber of the separation tank is provided with multiple sets of lower sewage tanks arranged distributed in a circular array, each of the lower sewage tanks is connected with a sewage outlet at a lower end, and lower ends of multiple sets of the sewage outlets are connected with sewage discharge branch pipes, a lower end of each of the sewage branch pipes is connected to a manifold, a lower end of the manifold is in a conical structure, and the lower end of the manifold is connected to the waste water tank through an inclined connecting pipe.

Preferably, an upper end of the separation tank is provided with a feed inlet, a processing box is arranged between the feed inlet and the feeding pipeline, and the processing box is provided with multiple sets of crushing rollers which are in linear arrangement and gear meshing connection, an upper end of each of the crushing rollers faces the feeding pipeline, and an outer end of each of the crushing rollers are driven by a rotation motor; an upper inclined outer wall of the processing box is provided with an water inlet facing the crushing rollers.

Preferably, an arc outer wall of the separation tank is provided with a pair of T-shaped sliding grooves in front and rear symmetrical with each other, one end of the outer wall of the separation tank is slidably sleeved with a semicircular ring outer arc plate, and an inner wall of the outer arc plate is provided with insertion strips corresponding to the sliding grooves, an end of the outer arc plate is fixedly connected to an end of the transverse telescopic sliding rod.

Preferably, one side of the outer wall of the separation tank corresponding to the transverse telescopic sliding rod is provided with a through hole, one end of the transverse telescopic sliding rod is slidably inserted into the through hole, the end of the transverse telescopic sliding rod extends along the through hole into the extrusion inner cavity, an other end of the transverse telescopic sliding rod is provided with a connection control block electrically connected to the heating sheet, and an outer wall of the connection control block is fixedly connected to the inner wall of the outer arc plate through connecting rods distributed circumferentially.

Preferably, the outer arc plate is sleeved and covered on the first cutting groove, the outer arc plate is provided with a second cutting groove misaligned with the first cutting groove, and a width of the first cutting groove is the same as a width of the second cutting groove.

Preferably, a lower end of the lower lifting post is fixed to an upper end of the waste water tank, an upper end of the lower lifting post is fixedly connected to a semicircular arc sealing plate through a screw, and an end of the semicircular arc sealing plate near the second side plate is provided with a chamfer.

Preferably, the upper end of the waste water tank is provided with a hinge seat, the inclined guide frame is rotatably arranged on the hinge seat, one end of the inclined guide frame is located at a lower end of one side of the arc sealing plate, and an other end of the inclined guide frame extends above the cooling conveyor belt.

Preferably, an outer wall of the cooling conveyor belt is attached to an outer wall of the waste water tank.

An operation method of the intelligent fecal solid-liquid separator for a cattle mattress bedding material production system, including the following steps:

S1: feeding materials into the separation tank through the feeding pipeline, and driving the extrusion screw rod to rotate through the drive motor, so as to form an extrusion transportation of waste, so that waste liquid is discharged into the waste water tank, and accumulated solid waste is gathered on one side of the pressing plate;

S2: as the waste accumulates, compressing the spring since one side of the pressing plate is subjected to pressure, so that the pressing plate slides laterally, causing the waste to densely extrude and gather into the extrusion inner cavity; when it moves to a fixed position, the upper lifting post drives the cutting assembly to lower down; cutting the waste by a cutting knife, so that the cutting assembly is located in the waste; inflating the fixed airbag, so that the first side plate and the second side plate slide towards both sides, further extruding the waste to achieve solid-liquid separation; at this time, the waste on one side of the second side plate is completely compressed in the extrusion inner cavity;

S3: heating the waste cut into blocks in the extrusion inner cavity by a heating sheet, causing the outer walls of the waste cut into blocks to dry and condense, then through a further contraction of the transverse telescopic sliding rod, releasing the blocks of the waste from an extrusion state and lowering down the lower lifting post, driving the blocks of the waste to be discharged along the inclined guide frame and the cooling conveyor belt.

Compared with the prior art, the advantageous effects of the present disclosure are as following:

The present disclosure achieves further an extrusion solid-liquid separation of separated solid waste by setting a cutting assembly, and also achieves block cutting treatment of waste at the same time. By utilizing the expansion of the airbag, symmetrical lateral pressure on both sides is achieved, so as to realize a further extrusion and drainage. And by utilizing the cooperation between the pressing plate and the spring, it ensures the extrusion pressure of the waste spiral extrusion, thereby improving the accuracy of solid-liquid separation. Combined with drying of the heating sheet, the waste is directly prepared into blocks, so that it is easy to transport, while the condensed shell is easy to lock in odors and protect the environment.

REFERENCE NUMBERS IN THE FIGURE

1. Separation tank; 2. Bracket; 3. Waste water tank; 4. Hinge seat; 5. Manifold; 6. Inclined connecting pipe; 7. Lower lifting post; 8. Inclined guide frame; 9. Cooling conveyor belt; 10. Extrusion screw rod; 11. Drive motor; 12. Feeding pipeline; 13. Sewage outlet; 14. Sewage discharge branch pipe; 15. Upper lifting post; 16. Micro air pump; 17. Extrusion inner cavity; 18. Outer arc plate; 19. Transverse telescopic sliding rod; 20. Cutting assembly; 21. Feed inlet; 22. First cutting groove; 23. Sliding slot; 24. Opening groove; 25. Pressing plate; 26. Lower sewage tank; 27. First side plate; 28. Protective ring; 29. Fixed airbag; 30. Second side plate; 31. Water inlet; 32. Rotation motor; 33. Crushing roller; 34. Processing box; 35. Cutting knife; 36. Through hole; 37. Spring; 38. Heating sheet; 39. Second cutting groove; 40. Insertion strips; 41. Connection control block; 42. Connecting rod; 43. Arc sealing plate; 44. Chamfer.

DETAILED DESCRIPTION OF THE EMBODIMENTS

The following will provide a clear and complete description of the technical solution in the embodiments of the present disclosure, in conjunction with the accompanying drawings. It is apparent that the described embodiments are only a part of the embodiments of the present disclosure, not all of them. Based on the embodiments in the present disclosure, all other embodiments obtained by ordinary skilled person in the art without creative labor fall within the scope of the present disclosure.

Figure 1:
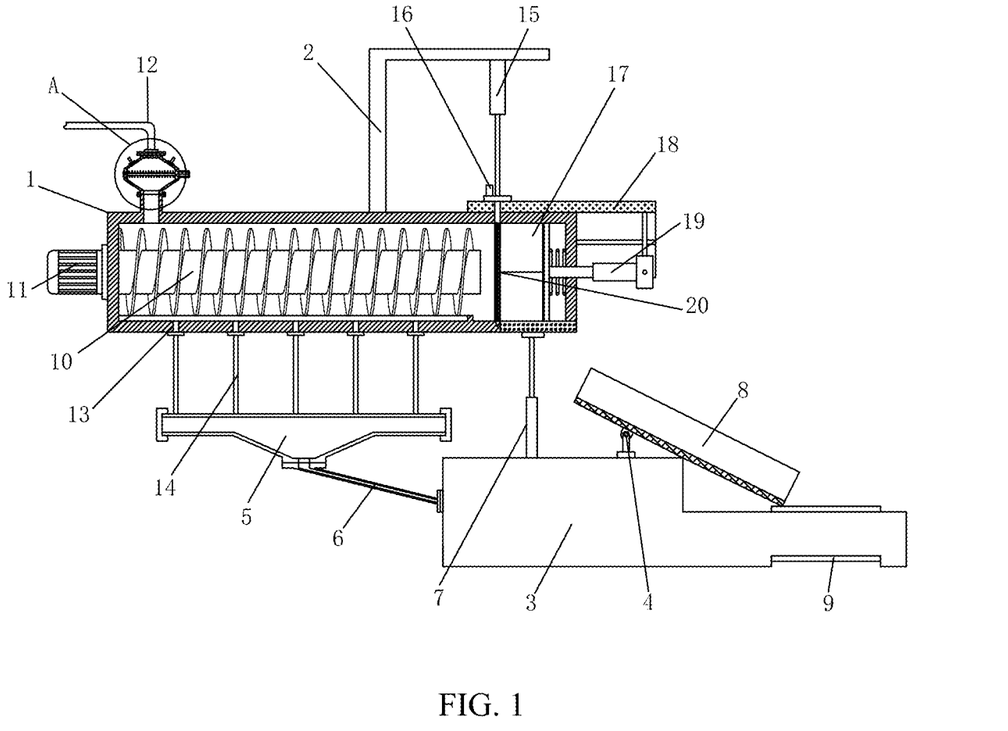
FIG. 1 is a structural schematic diagram of the present disclosure.
Figure 2:
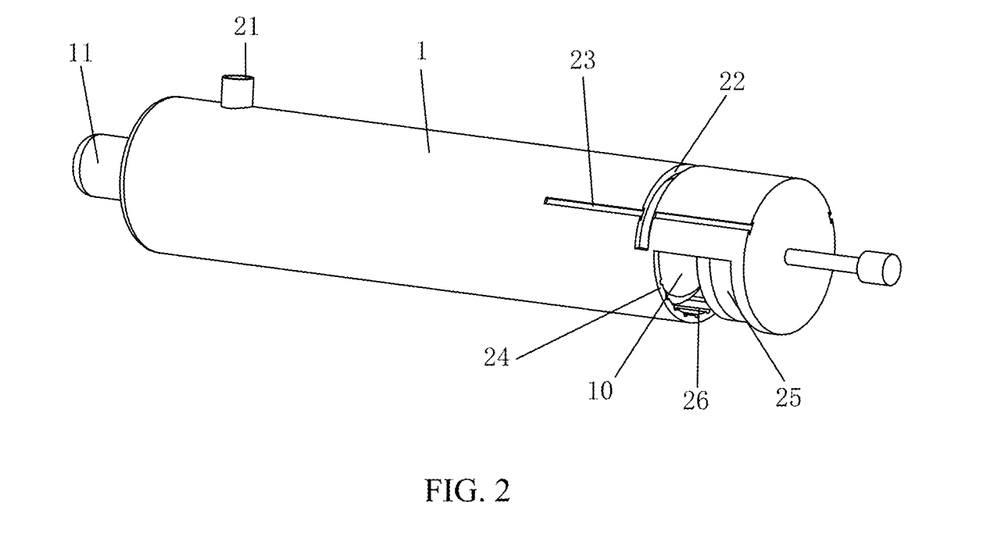
FIG. 2 is a schematic diagram of the three-dimensional structure of the separation tank of the present disclosure.
Figure 3:
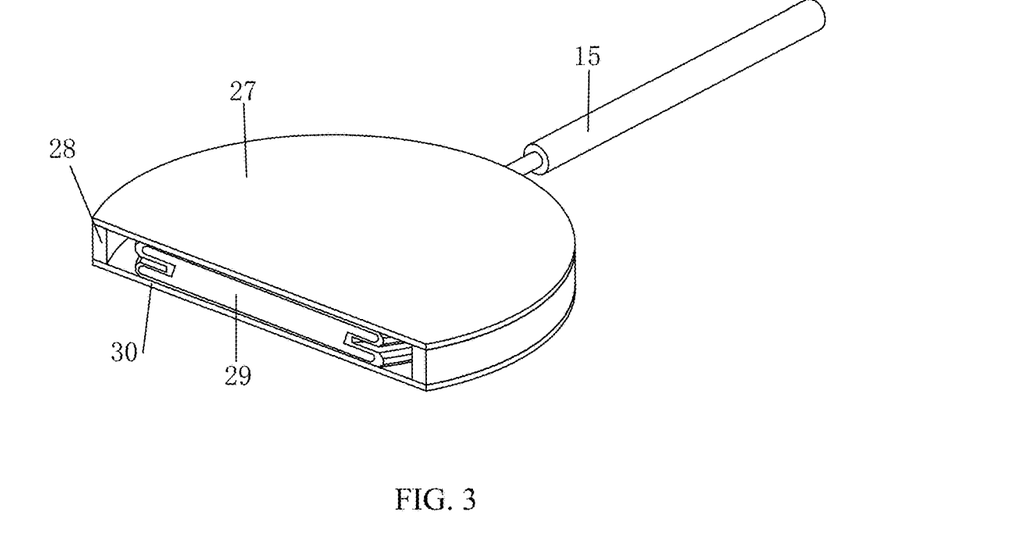
FIG. 3 is a cross-sectional view of the cutting assembly structure of the present disclosure.
Figure 4:
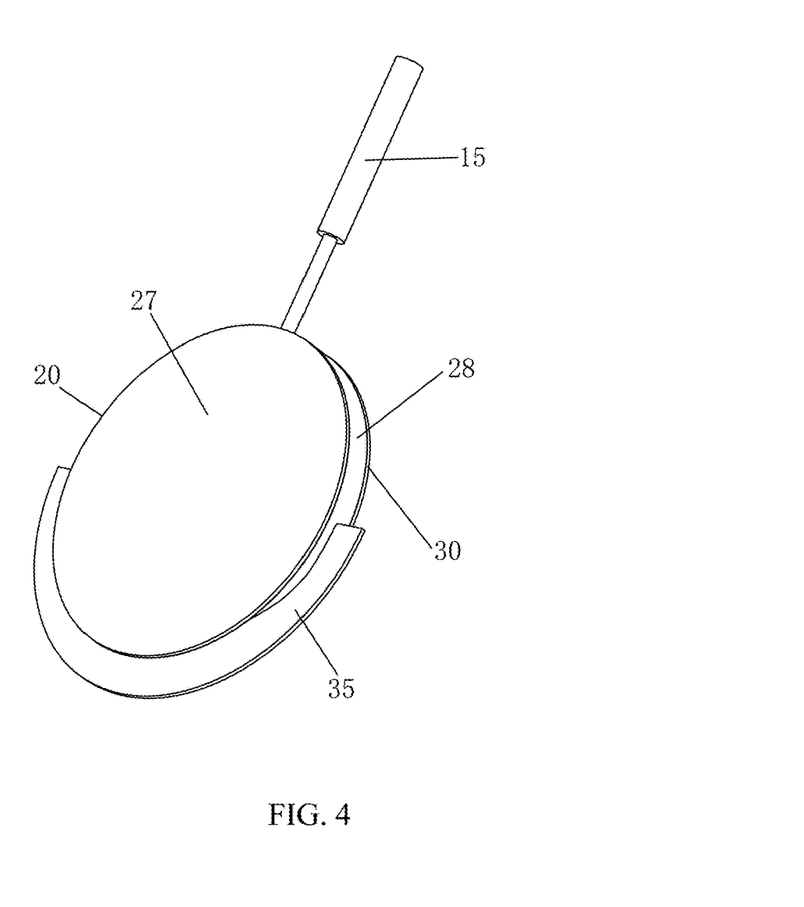
FIG. 4 is a schematic diagram of the three-dimensional structure of the cutting assembly of the present disclosure.
Figure 5:
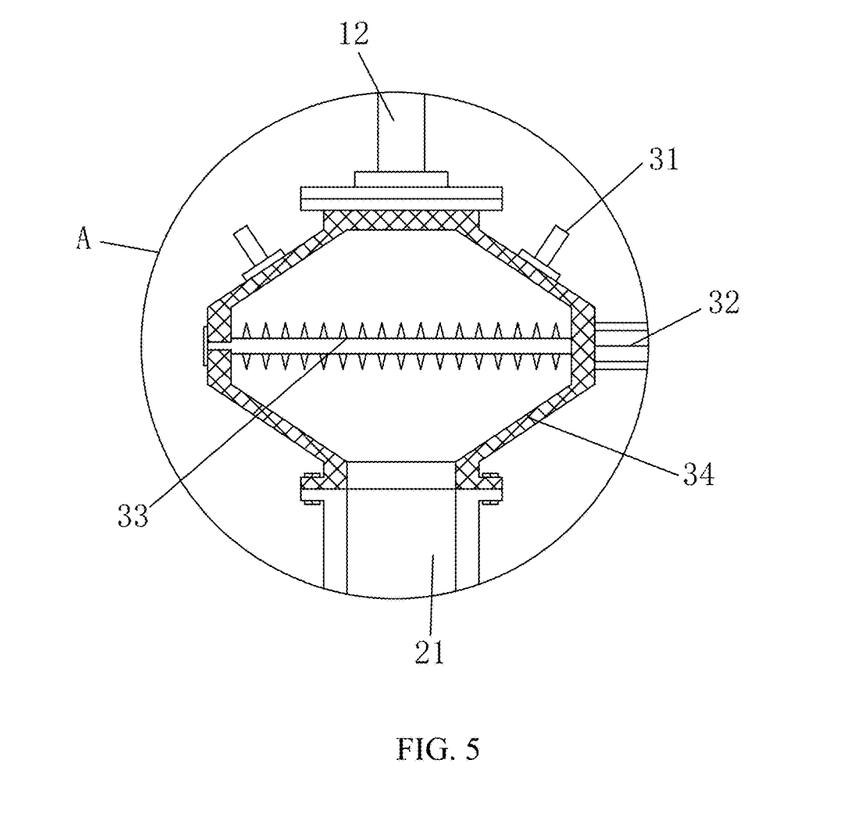
FIG. 5 is an enlarged view of the structure at position A in FIG. 1.
Figure 6:
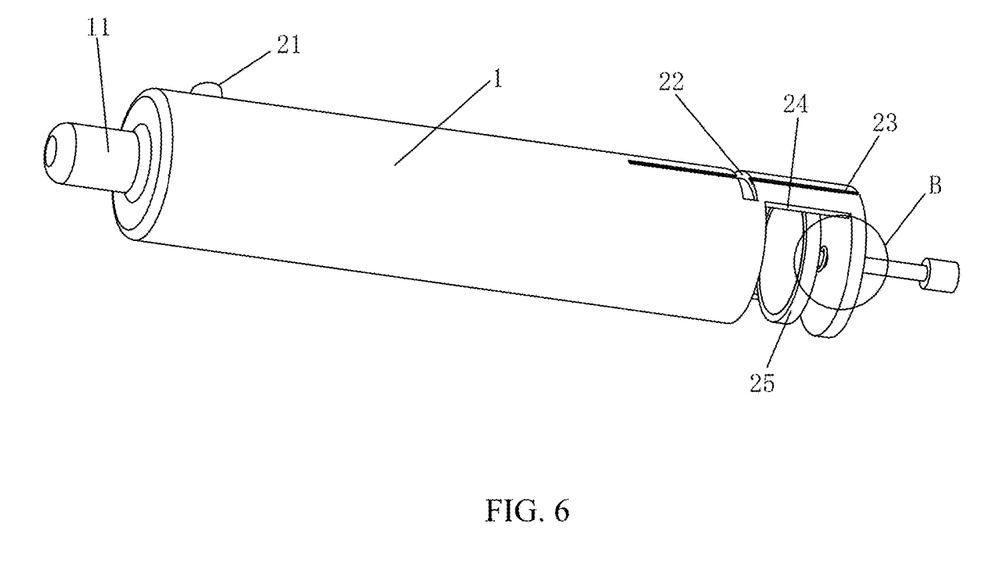
FIG. 6 is a schematic diagram of the separation tank structure of the present disclosure.
Figure 7:
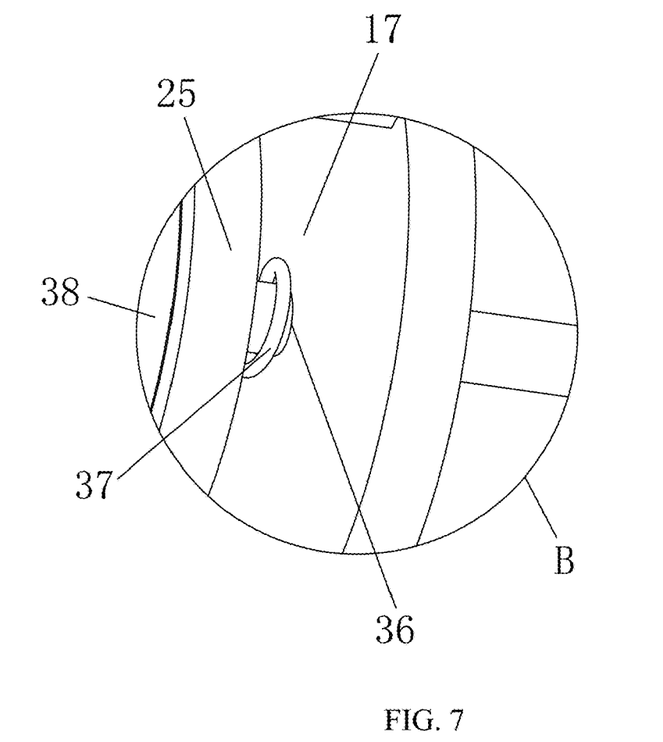
FIG. 7 is an enlarged view of the structure at position B in FIG. 6.
Figure 8:
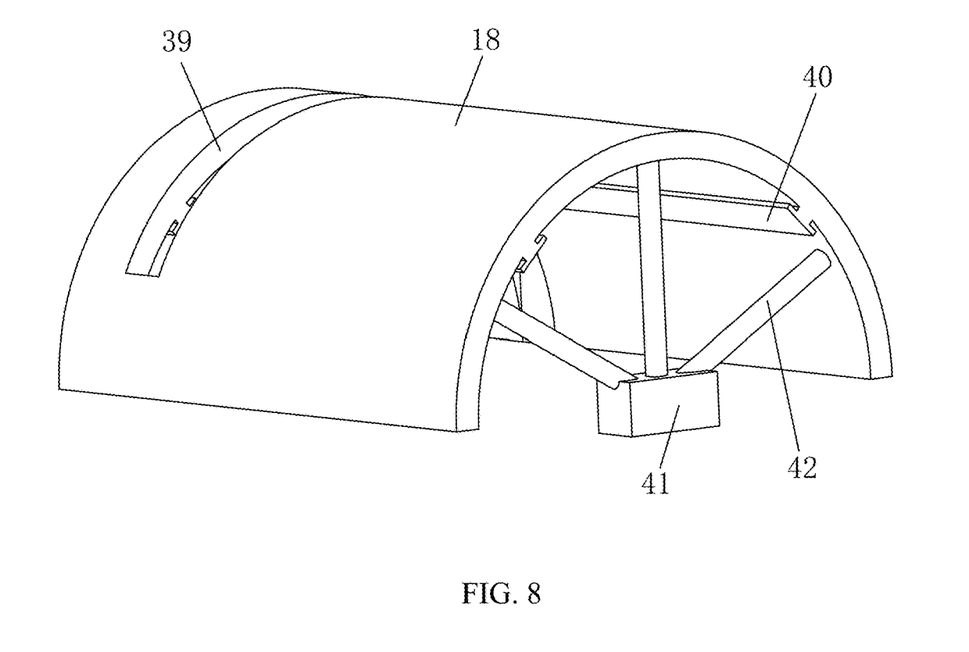
FIG. 8 is a schematic diagram of the three-dimensional structure of the outer arc plate of the present disclosure.
Figure 9:
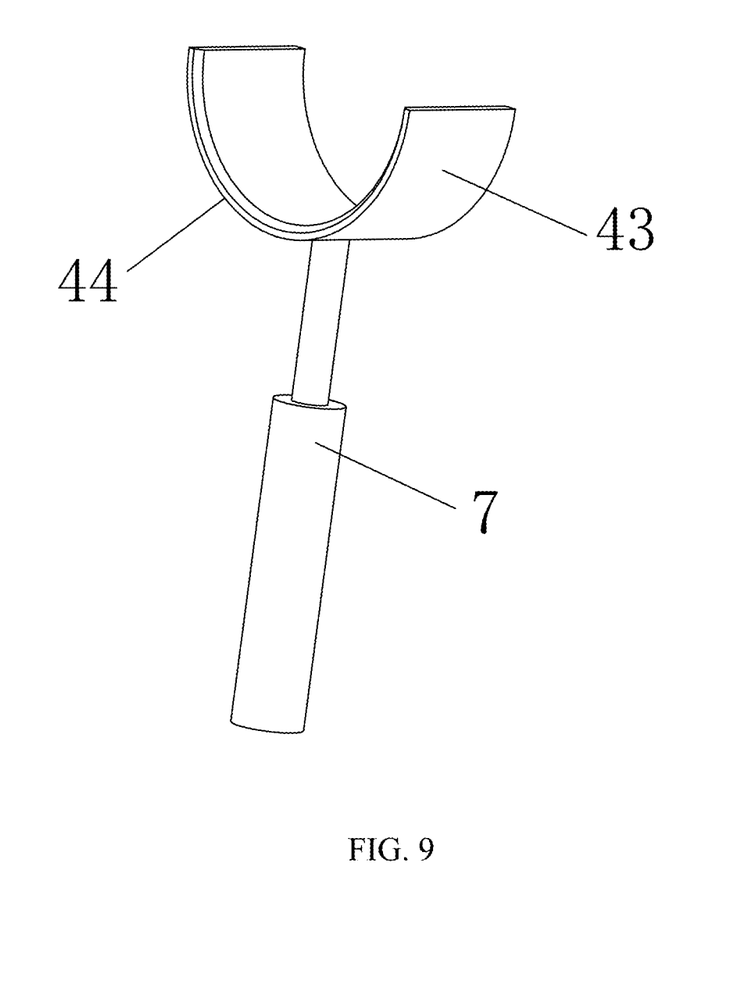
FIG. 9 is a schematic diagram of the three-dimensional structure of the arc sealing plate of the present disclosure.

Please refer to FIGS. 1 to 9, technical solutions provided by the present disclosure are shown as below:

Embodiment 1

An intelligent fecal solid-liquid separator for a cattle mattress bedding material production system is provided, including a solid-liquid separator. The solid-liquid separator includes a separation tank 1, a pressure bearing assembly, a cutting assembly 20 and a transmission assembly.

The separation tank 1 is horizontally provided with an extrusion screw rod 10 driven by a drive motor 11, a feeding pipeline 12 is connected to one end of the separation tank 1, and a lower end of the separation tank 1 is connected to a waste water tank 3.

The waste materials are fed through the feeding pipeline 12, and the separated waste water is received through the waste water tank 3. The use the rotation of the extrusion screw rod 10 to achieve the purpose of spiral transportation and extrusion of waste, achieving solid-liquid separation.

The length of the extrusion screw rod 10 is smaller than the length of the separation tank 1. The gap between the end of the extrusion screw rod 10 and the inner wall of the separation tank 1 is set with an extrusion inner cavity 17, a semicircular opening groove 24 runs through the lower part of the extrusion inner cavity 17, and a first cutting groove 22 is arranged at the upper end of the extrusion inner cavity 17 corresponding to the upper lifting post 15. A pressure bearing assembly includes a pressing plate 25, a spring 37, a transverse telescopic sliding rod 19, and a heating sheet 38. The pressing plate 25 is slidably arranged in the extrusion inner cavity 17. The heating sheet 38 is arranged on one side wall of the pressing plate 25 near the extrusion screw rod 10, and the other side of the pressing plate 25 is connected to the transverse telescopic sliding rod 19. The transverse telescopic sliding rod 19 is horizontally sleeved with the spring 37, the spring 37 is located in the extrusion inner cavity 17, and the two ends of the spring 37 are pressed between the pressing plate 25 and the lateral inner wall of the extrusion inner cavity 17.

By setting the lateral sliding of the pressing plate 25 to cooperate with the support of the spring 37, the spring 37 is compressed as the waste accumulates, causing the waste to accumulate in the extrusion inner chamber 17. During the extrusion process, the spring 37 continues to compress, so that the elastic force increases. The pressing plate 25 maintains the lateral extrusion pressure on the waste, and the efficiency of solid-liquid separation is improved through lateral extrusion.

The upper end of the end of the separation tank 1 away from the feeding pipeline 12 is provided with a bracket 2, and the bracket 2 is provided with the upper lifting post 15 vertically arranged and downward extending. A cutting assembly 20 located directly above the first cutting groove 22, which includes a fixed airbag 29, a micro air pump 16, a protective ring 28, a first side plate 27, a second side plate 30, and a semicircular cutting knife 35. The cutting assembly 20 is fixedly arranged at the lower end of the upper lifting post 15, the middle of the fixed airbag 29 is connected to the protective ring 28, and the two side walls of the fixed airbag 29 are tightly bonded to the first side plate 27 and the second side plate 30 respectively. The first side plate 27 and the second side plate 30 are pressed on both sides of the protective ring 28, a semicircular cutting knife 35 is arranged at the lower end of the protective ring 28, the first side plate 27 faces the extrusion screw rod 10, and the second side plate 30 faces the extrusion inner cavity 17.

By the upper lifting post 15 to drive the cutting assembly 20 to lower down, the accumulated waste material is vertically cutting by the cutting knife 35, so that the cutting assembly 20 is located in the waste material. The fixed airbag 29 is inflated and expanded through the micro air pump 16, causing the first side plate 27 and the second side plate 30 to slide towards both sides, extruding the waste material on both sides, further improving the solid-liquid separation efficiency. At this time, the waste material on one side of the second side plate 30 is completely compressed in the extrusion cavity 17, heating the block waste after cutting through a heating sheet 38, so as to make the surface of the cut waste condensation and prevent loosening.

A transmission assembly, including an arc sealing plate 43, a lower lifting post 7, a inclined guide frame 8, and a cooling conveyor belt 9. The arc sealing plate 43 is sealed and snapped in the semicircular opening groove 24, the lower end of the arc sealing plate 43 is vertically connected to the lower lifting post 7, one side of the lower lifting post 7 is provided with the inclined guide frame 8 and the cooling conveyor belt 9 interconnected with each other.

By further contracting the transverse telescopic sliding rod 19, the spring 37 is further compressed, increasing the gap between the pressing plate 25 and the second side plate 30, causing the block waste to be released from the extrusion state. The lower lifting post 7 lowers down, so as to drive the block waste to be discharged along the inclined guide frame 8 and the cooling conveyor belt 9.

Embodiment 2

On the basis of Embodiment 1, the lower inner wall of the inner chamber of the separation tank 1 is provided with multiple sets of lower sewage tanks 26 arranged distributed in a circular array. Each of the lower sewage tanks 26 is connected with a sewage outlet 13 at the lower end, and the lower ends of multiple sets of the sewage outlets 13 are connected with sewage discharge branch pipes 14. The lower end of each of the sewage branch pipes 14 is connected to the manifold 5, the lower end of the manifold 5 is in a conical structure, and the lower end of the manifold 5 is connected to the waste water tank 3 through an inclined connecting pipe 6.

By setting the lower sewage tank 26, the waste liquid separated by extrusion can be guided, recycled and separated.

Embodiment 3

On the basis of Embodiment 1, the upper end of the separation tank 1 is provided with a feed inlet 21, a processing box 34 is arranged between the feed inlet 21 and the feeding pipeline 12, and the processing box 34 is provided with multiple sets of crushing rollers 33 which are in linear arrangement and gear meshing connection. The upper end of each of the crushing rollers 33 faces the feeding pipeline 12, and the outer end of each of the crushing rollers 33 are driven by a rotation motor 32. The upper inclined outer wall of the processing box 34 is provided with an water inlet 31 facing the crushing rollers 33, and the crushing rollers 33 is connected to an external water pump.

By setting the water inlet 31, the incoming waste can be replenished with water, fully dissolving the soluble impurities in the waste, so as to improve the purity of the raw material after solid-liquid separation. At the same time, the crushing roller 33 is used to achieve full crushing of the raw material, making it fully contact with water and dissolved.

Embodiment 4

On the basis of Embodiment 3, the arc outer wall of the separation tank 1 is provided with a pair of T-shaped sliding grooves 23 in front and rear symmetrical with each other, one end of the outer wall of the separation tank 1 is slidably sleeved with a semicircular ring outer arc plate 18, the inner wall of the outer arc plate 18 is provided with insertion strips 40 corresponding to the sliding grooves 23, and the end of the outer arc plate 18 is fixedly connected to the end of the transverse telescopic sliding rod 19.

The installation of the outer arc plate 18 is achieved by setting the sliding grooves 23 in conjunction with the insertion of the insertion strips 40, thus achieving the purpose of sealing the first cutting slot 22 during the extrusion process.

One side of the outer wall of the separation tank 1 corresponding to the transverse telescopic sliding rod 19 is provided with a through hole 36. One end of the transverse telescopic sliding rod 19 is slidably inserted into the through hole 36, the end of the transverse telescopic sliding rod 19 extends along the through hole 36 into the extrusion inner cavity 17, the other end of the transverse telescopic sliding rod 19 is provided with a connection control block 41 electrically connected to the heating sheet 38. The outer wall of the connection control block 41 is fixedly connected to the inner wall of the outer arc plate 18 through connecting rods 42 distributed circumferentially.

By setting the connection control block 41 and the connecting rod 42, the linkage between the transverse telescopic sliding rod 19 and the outer arc plate 18 is achieved, so that the outer arc plate 18 is driven to slide transversely in parallel when the pressing plate 25 is moved transversely.

The outer arc plate 18 is sleeved and covered on the first cutting groove 22, the outer arc plate 18 is provided with a second cutting groove 39 misaligned with the first cutting groove 22, and the width of the first cutting groove 22 is the same as the width of the second cutting groove 39.

With the lateral sliding of the outer arc plate 18, the first cutting groove 22 and the second cutting groove 39 which are staggered with each other are brought closer to each other and eventually the first cutting groove 22 and the second cutting groove 39 overlap each other, at this moment, the cutting assembly 20 drops to achieve the purpose of cutting.

Embodiment 5

On the basis of Embodiment 4, the lower end of the lower lifting post 7 is fixed to the upper end of the waste water tank 3, the upper end of the lower lifting post 7 is fixedly connected to a semicircular arc sealing plate 43 through a screw, and the end of the semicircular arc sealing plate 43 near the second side plate 30 is provided with a chamfer 44.

By setting the chamfer 44 on the arc sealing plate 43, it is convenient for the second side plate 30 to slide laterally onto the arc sealing plate 43.

The upper end of the waste water tank 3 is provided with a hinge seat 4, the inclined guide frame 8 is rotatably arranged on the hinge seat 4, one end of the inclined guide frame 8 is located at the lower end of one side of the arc sealing plate 43, and the other end of the inclined guide frame 8 extends above the cooling conveyor belt 9. The outer wall of the cooling conveyor belt 9 is attached to the outer wall of the waste water tank 3.

The communication is achieved by adjusting the tilting angle of the inclined guide frame 8 through the hinge seat 4. As the lower lifting post 7 lowers down, the block waste gradually descends under the support of the arc sealing plate 43 and falls onto the inclined guide frame 8 and the cooling conveyor belt 9. The cooling conveyor belt 9 is attached to the waste water tank 3 to achieve the purpose of cooling and heating the block waste.

An operation method of the intelligent fecal solid-liquid separator for a cattle mattress bedding material production system, including the following steps:

S1: feeding materials into the separation tank 1 through the feeding pipeline 12, and driving the extrusion screw rod 10 to rotate through the drive motor 11, so as to form an extrusion transportation of waste, so that waste liquid is discharged into the waste water tank 3, and accumulated solid waste is gathered on one side of the pressing plate 25;

S2: as the waste accumulates, compressing the spring 37 since one side of the pressing plate 25 is subjected to pressure, so that the pressing plate 25 slides laterally, causing the waste to densely gather into the extrusion inner cavity 17; when it moves to a fixed position, the upper lifting post 15 drives the cutting assembly 20 to lower down; cutting the waste by a cutting knife 35, so that the cutting assembly 20 is located in the waste; inflating the fixed airbag 29, so that the first side plate 27 and the second side plate 30 slide towards both sides, further extruding the waste to achieve solid-liquid separation; at this time, the waste on one side of the second side plate 30 is completely compressed in the extrusion inner cavity 17;

S3: heating the waste cut into blocks in the extrusion inner cavity 17 by a heating sheet 38, causing the outer wall to dry and condense, then through a further contraction of the transverse telescopic sliding rod 19, releasing the blocks of the waste from an extrusion state and lowering down the lower lifting post 7, driving the blocks of the waste to be discharged along the inclined guide frame 8 and the cooling conveyor belt 9.

Although embodiments of the present disclosure have been shown and described, it can be understood by ordinary skilled person in the art that various changes, modifications, substitutions, and variations can be made to these embodiments without departing from the principles and spirit of the present disclosure, and the scope of the present disclosure is limited by the claims and their equivalents.

What is claimed is:

1. An intelligent fecal solid-liquid separator for a cattle mattress bedding material production system, the intelligent fecal solid-liquid separator comprising:

a separation tank (1), wherein the separation tank (1) is horizontally provided with an extrusion screw rod (10) driven by a drive motor (11), a feeding pipeline (12) is connected to an upper of one end of the separation tank (1), a lower end of the separation tank (1) is connected to a waste water tank (3), one end of the separation tank (1) away from the feeding pipeline (12) is provided with a bracket (2), the bracket (2) is provided with an upper lifting post (15) vertically arranged and downward extending, a length of the extrusion screw rod (10) is smaller than a length of the separation tank (1), a gap between an end of the extrusion screw rod (10) and an inner wall of the separation tank (1) is set with an extrusion inner cavity (17), a semicircular opening groove (24) runs through a lower part of the extrusion inner cavity (17), and a first cutting groove (22) is arranged at an upper end of the extrusion inner cavity (17) corresponding to the upper lifting post (15);

a pressure bearing assembly, comprising a pressing plate (25), a spring (37), a transverse telescopic sliding rod (19), and a heating sheet (38), wherein the pressing plate (25) is slidably arranged in the extrusion inner cavity (17), the heating sheet (38) is arranged on one side wall of the pressing plate (25) near the extrusion screw rod (10), an other side of the pressing plate (25) is connected to the transverse telescopic sliding rod (19), the transverse telescopic sliding rod (19) is horizontally sleeved with the spring (37), the spring (37) is located in the extrusion inner cavity (17), and two ends of the spring (37) are pressed between the pressing plate (25) and a lateral inner wall of the extrusion inner cavity (17);

a cutting assembly (20) located directly above the first cutting groove (22), comprising a fixed airbag (29), a micro air pump (16), a protective ring (28), a first side plate (27), a second side plate (30), and a semicircular cutting knife (35), wherein the cutting assembly (20) is fixedly arranged at a lower end of the upper lifting post (15), a middle of the fixed airbag (29) is connected to the protective ring (28), two side walls of the fixed airbag (29) are tightly bonded to the first side plate (27) and the second side plate (30) respectively, the first side plate (27) and the second side plate (30) are pressed on both sides of the protective ring (28), a semicircular cutting knife (35) is arranged at a lower end of the protective ring (28), the first side plate (27) faces the extrusion screw rod (10), and the second side plate (30) faces the extrusion inner cavity (17);

a transmission assembly, comprising an arc sealing plate (43), a lower lifting post (7), a inclined guide frame (8), and a cooling conveyor belt (9), wherein the arc sealing plate (43) is sealed and snapped in the semicircular opening groove (24), a lower end of the arc sealing plate (43) is vertically connected to the lower lifting post (7), one side of the lower lifting post (7) is provided with the inclined guide frame (8) and the cooling conveyor belt (9) interconnected with each other.

2. The intelligent fecal solid-liquid separator for a cattle mattress bedding material production system according to claim 1, wherein a lower inner wall of an inner chamber of the separation tank (1) is provided with multiple sets of lower sewage tanks (26) distributed in a circular array, each of the lower sewage tanks (26) is connected with a sewage outlet (13) at a lower end, and lower ends of multiple sets of the sewage outlets (13) are connected with sewage discharge branch pipes (14), a lower end of each of the sewage branch pipes (14) is connected to a manifold (5), a lower end of the manifold (5) is in a conical structure, and the lower end of the manifold (5) is connected to the waste water tank (3) through an inclined connecting pipe (6).

3. The intelligent fecal solid-liquid separator for a cattle mattress bedding material production system according to claim 2, wherein an upper end of the separation tank (1) is provided with a feed inlet (21), a processing box (34) is arranged between the feed inlet (21) and the feeding pipeline (12), and the processing box (34) is provided with multiple sets of crushing rollers (33) which are in linear arrangement and gear meshing connection, an upper end of each of the crushing rollers (33) faces the feeding pipeline (12), and an outer end of each of the crushing rollers (33) are driven by a rotation motor (32); and an upper inclined outer wall of the processing box (34) is provided with an water inlet (31) facing the crushing rollers (33).

4. The intelligent fecal solid-liquid separator for a cattle mattress bedding material production system according to claim 1, wherein an arc outer wall of the separation tank (1) is provided with a pair of T-shaped sliding grooves (23) in front and rear symmetrical with each other, one end of the outer wall of the separation tank (1) is slidably sleeved with a semicircular ring outer arc plate (18), an inner wall of the outer arc plate (18) is provided with insertion strips (40) corresponding to the sliding grooves (23), and an end of the outer arc plate (18) is fixedly connected to an end of the transverse telescopic sliding rod (19).

5. The intelligent fecal solid-liquid separator for a cattle mattress bedding material production system according to claim 4, wherein one side of the outer wall of the separation tank (1) corresponding to the transverse telescopic sliding rod (19) is provided with a through hole (36), one end of the transverse telescopic sliding rod (19) is slidably inserted into the through hole (36), the end of the transverse telescopic sliding rod (19) extends along the through hole (36) into the extrusion inner cavity (17), an other end of the transverse telescopic sliding rod (19) is provided with a connection control block (41) electrically connected to the heating sheet (38), and an outer wall of the connection control block (41) is fixedly connected to the inner wall of the outer arc plate (18) through connecting rods (42) distributed circumferentially.

6. The intelligent fecal solid-liquid separator for a cattle mattress bedding material production system according to claim 5, wherein the outer arc plate (18) is sleeved and covered on the first cutting groove (22), the outer arc plate (18) is provided with a second cutting groove (39) misaligned with the first cutting groove (22), and a width of the first cutting groove (22) is the same as a width of the second cutting groove (39).

7. The intelligent fecal solid-liquid separator for a cattle mattress bedding material production system according to claim 1, wherein a lower end of the lower lifting post (7) is fixed to an upper end of the waste water tank (3), an upper end of the lower lifting post (7) is fixedly connected to a semicircular arc sealing plate (43) through a screw, and an end of the semicircular arc sealing plate (43) near the second side plate (30) is provided with a chamfer (44).

8. The intelligent fecal solid-liquid separator for a cattle mattress bedding material production system according to claim 1, wherein the upper end of the waste water tank (3) is provided with a hinge seat (4), the inclined guide frame (8) is rotatably arranged on the hinge seat (4), one end of the inclined guide frame (8) is located at a lower end of one side of the arc sealing plate (43), and an other end of the inclined guide frame (8) extends above the cooling conveyor belt (9).

9. The intelligent fecal solid-liquid separator for a cattle mattress bedding material production system according to claim 8, wherein an outer wall of the cooling conveyor belt (9) is attached to an outer wall of the waste water tank (3).

10. An operation method of the intelligent fecal solid-liquid separator for a cattle mattress bedding material production system according to claim 1, the operation method comprises the following steps:

S1: feeding materials into the separation tank (1) through the feeding pipeline (12), and driving the extrusion screw rod (10) to rotate through the drive motor (11), so as to form an extrusion transportation of waste, so that waste liquid is discharged into the waste water tank (3), and accumulated solid waste is gathered on one side of the pressing plate (25);

S2: as the waste accumulates, compressing the spring (37) since one side of the pressing plate (25) is subjected to pressure, so that the pressing plate (25) slides laterally, causing the waste to densely extrude and gather into the extrusion inner cavity (17); when it moves to a fixed position, the upper lifting post (15) drives the cutting assembly (20) to lower down; cutting the waste by a cutting knife (35), so that the cutting assembly (20) is located in the waste; inflating the fixed airbag (29), so that the first side plate (27) and the second side plate (30) slide towards both sides, further extruding the waste to achieve solid-liquid separation; at this time, the waste on one side of the second side plate (30) is completely compressed in the extrusion inner cavity (17);

S3: heating the waste cut into blocks in the extrusion inner cavity (17) by a heating sheet (38), causing outer walls of the waste cut into blocks to dry and condense, then through a further contraction of the transverse telescopic sliding rod (19), releasing the blocks of the waste from an extrusion state and lowering down the lower lifting post (7), driving the blocks of the waste to be discharged along the inclined guide frame (8) and the cooling conveyor belt (9).

* * * * *